Patented July 17, 1951

2,560,871

UNITED STATES PATENT OFFICE 2,560,871

METHOD OF MIXING CEMENT COMPOSITION

George H. Johnson and Roland C. Higgins, New Orleans, La., assignors, by mesne assignments, to Higgins, Inc., New Orleans, La., a corporation of Louisiana No Drawing. Application April 28, 1948, Serial No. 23,876

6 Claims. (Cl. 106—87)

This invention relates to a gas expanded, cellular cement product useful for walls, floors, ceilings, etc. of building structures, and to the method of making the same.

Gas expanded cellular cement obtained by expanding the cement with gas forming reagents is broadly old in the art. However, such cement has never acquired large scale commercial usefulness because of the varying and unpredictable properties resulting from improper combination of ingredients used or the improper control of the reaction and mixing of the ingredients, or both. Most known types of concrete mixes include calcium hydroxide, which compound has many disadvantages which are overcome by the substitution of sodium hydroxide in accordance with the present invention.

An object of the present invention, therefore, is to provide a gas expanded, cellular cement substance which is devoid of the above-mentioned disadvantages, and whose physical characteristics can be accurately controlled or predetermined.

A more specific object of the present invention is to provide a gas expanded, cellular cement composition having a remarkably high strength-to-weigh ratio, having a high initial strength and hardness, and which has many of the desirable characteristics of wood in that it can be sawed and nails and screws may be driven therein.

A still further object of the present invention is to provide a gas expanded, cellular cementitious construction unit whose cells are minute, substantially uniform in size and substantially independent, that is, not in intercommunication, therefore, which unit is extremely light in weight and has high heat insulating characteristics, as well as being moisture-proof, vermin-proof and dust free.

A still further object of the present invention is to provide a gas expanded cellular cement substance that is reinforced with metal lath or the like and which is hurricane-proof and earthquake-proof.

A still further object of the present invention is to provide a novel method of making a gas expanded, cellular cement substance which involves an optimum combination and proportioning of ingredients as well as a definite order and schedule of mixing thereof so as to obtain predetermined, highly useful characteristics.

Other objects and advantages of the present invention will become apparent from the following description of the invention.

The formula or cementitious mixture used in the present invention comprises the following materials, used in proportions which will be described hereinafter: Portland cement, water, aluminum flake, caustic soda, and bituminous emulsion.

The Portland cement can be either standard grade, high early strength or air entraining. The aluminum flake is preferably of fine particle size and unpolished, although other types are also suitable for certain mixes. The caustic soda is commonly employed in flake form as a matter of convenience, but the equivalent in solution form may be used instead for the purposes of the reaction. The bituminous emulsion contains about 55% asphaltic material, a small percentage of emulsifying agent and the balance water. The emulsifying agent is neutral in hydrogen ion concentration.

Method of mixing constituents

In order to form a gas expanded, cellular concrete substance involving the many advantageous characteristics set forth hereinabove, it is necessary to accurately control the properties of the end product by carefully selecting and proportioning the ingredients, and by scheduling the mixing and pouring operations as well. While good results may be obtained in several ways, experiments show that best results are obtained by following a predetermined order of adding the ingredients as well as by the use of special types of mixing equipment to effect vigorous mixing, and by careful scheduling of the mixing time.

As stated above, the successful use of the above-described mixture depends on combining the ingredients in certain proportions. A preferred composition to obtain the proper ratio or proportion of ingredients and preferred mixing procedure are as follows: Forty gallons of water and one gallon of bituminous emulsion (55% ratio) are thoroly mixed. Then eight 94 lb. sacks of Portland cement are added, and the mixture is mixed violently for two minutes, preferably by a special mixer which effects violent agitation which is described hereinafter. Thereafter, $\frac{7}{10}$ pounds of fine aluminum flake is added, and the resulting mixture is mixed violently for thirty seconds. About 1.4 pounds sodium hydroxide is then added, and the resulting mixture is mixed violently for about thirty seconds more, or until the point of "incipient gelation" is reached, that is, when the mix has just passed the truly liquid stage and is beginning to acquire a small but finite yield value. That is, it has acquired enough plastic strength to keep the discrete bubbles separate but not enough to prevent their growth. After incipient gelation is obtained, the mixture is poured into suitable forms such as those used for constructing a house or component parts thereof.

When the ingredients are mixed, hydrogen is evolved by the reaction of the alkali on the aluminum. Discrete bubbles are formed which cause the mass to swell in volume. And as these bubbles retain their identity during setting of the cement, the final product is an expanded cement mixture containing minute voids, asphalt distributed through the mixture and a proportion of free water. With the proportions given above, the product has a density as cast of about forty-five to sixty pounds per cubic foot and 16% uncombined water.

The mixing and pouring should be done at temperatures above 50° F. for best results, that is, for shorter time periods for the ingredients to become heated, unless some of the ingredients are already heated.

The critical time in the mixing operation is that between the addition of the aluminum and the pouring, which time should be not less than one minute nor more than five minutes under normal temperatures of between 60° F. and 90° F. The temperature does not make the mixing time vary, but merely affects the speed with which the resulting mixture rises and with which the chemical action takes place.

After the cement mixture is placed in suitable forms, it expands in volume to about 2¼ times its original volume, thereby attaining relatively low density and weight. It will set over night so that the forms may be removed the next day, thus making it possible to erect an entire house or building in the matter of a few days.

The functions of the various materials are as follows: the Portland cement reacts with a portion of the water to form the complex hydrate of the set cement. A portion of the cement probably also reacts with the aluminum and caustic soda present to develop hydrogen, but this reaction is small since the amount of caustic soda present is considerably more than required to exhaust the aluminum. The remaining part of water remains uncombined in the mass. An excess of water over that of the combination is necessary to provide mobility of the mix prior to pouring.

The aluminum flake reacts with the caustic soda and water to generate hydrogen for expansion of the mass leaving sodium aluminate. Since the aluminum is present in less than combining proportion, and since no aluminum appears in the final product, it definitely appears that the aluminum is exhausted in the reaction.

The principal function of the caustic soda is to react with the aluminum and water to form hydrogen and sodium aluminate. However, it also assists in the formation of the final product by controlling the initial set of the Portland cement. It contributes a little to stimulating the reaction by increasing the amount of heat generated. It probably also enters into the reaction between the cement and water. The sodium hydroxide is found to be remarkably good for the reaction and is far superior to calcium hydroxide. If calcium hydroxide, which is commonly used in cement mixtures, is substituted for sodium hydroxide, a less desirable structure is obtained, that is, one which is non-uniform in structure and which slumps badly before setting, as distinguished from the uniformly sized and distributed cells obtained when using sodium hydroxide instead. The sodium hydroxide probably also has a solvating action on the Portland cement, helping to change the consistency of the mix to that required to produce a uniform structure without slumping or bleeding. The sodium hydroxide attacks the raw Portland cement to an extent far greater than calcium hydroxide, which probably accounts for the outstanding advantages of the former.

The bituminous emulsion has several functions. It improves the consistency of the mix so that bubbles of hydrogen show but little tendency to coalesce, resulting in a more finely grained, uniform structure, and one with less tendency to settle and slump than if the bituminous emulsion were omitted. The mechanical properties are apparently improved for this reason. In addition, the bituminous material also seems to reduce the brittleness of the final product and reduces the transmission of water so as to make a substantially water-proof structure.

The above indicated proportion of water is the proper amount to react with the cement, sodium hydroxide and aluminum to provide good pouring consistency in the mix and allow proper expansion of the mass. Less water would not only interfere with handling the mix, but would result in a density higher than that desired in the final product. More water would result in a sloppy mix inclined to leak through the forms and to slump and become non-uniform in structure. The addition of more water would also yield a product higher in uncombined water and one which has greater tendency to shrink on aging or drying.

The amount of aluminum flake indicated is of such proportion that it will be exhausted in the reaction and will develop just the right amount of gas (hydrogen) to produce the desired density in the final cement. The proportion is adjusted so that the gas is developed simultaneously upon initial setting of the cement to plastic consistency. If less aluminum is used, the expansion will be insufficient; if more is used, the expansion resulting from formation of gas may continue after the initial set has occurred, therefore rupturing the cell walls, causing check and weakening of the structure.

The proportion of sodium hydroxide is to provide the proper amount that is necessary to attack the aluminum at the proper rate, and at the same time control the setting of the cement so that the expansion is complete just before initial setting of the cement takes place. The amount of free sodium hydroxide left should be kept at a minimum value so as to avoid too alkaline a final product. If such final product is too alkaline, difficulties in finishing the surface are encountered as well as efflorescence upon aging, both of which should be avoided.

The specific proportion of bituminous emulsion is chosen so that it will serve the important function of controlling uniformity in structure. Larger quantities, strangely enough, have an adverse effect and result in slumping or partial collapse before setting. Possibly this is caused by the emulsifying agent necessarily included in the emulsion, rather than by the bituminous material. Or the bituminous material in excess of the ratio indicated may interfere with the proper balance of ingredients to obtain the initial set and let the gaseous expansion occur in an uncontrolled manner. However, best results are obtained by using the above-mentioned proportion of bituminous emulsion.

The resulting product has the following characteristics: a gas expanded cellular mass containing minute substantially uniformly sized voids; asphalt distributed through the mixture as well as a proportion of free water; a density ranging between 45 and 60 pounds per cubic foot as set; a moisture content (uncombined water) averaging between 14% and 18%; compressive strength after twenty-eight days of about 500 p. s. i.; a K factor of about 1.4 B. t. u. per hour per square foot per unit of thickness per degree difference in temperature Fahrenheit, and low heat retentivity.

It will be apparent that certain departures may be made from the above-described composition or specific proportion of materials or in the schedule of mixing. It has been commonly thought that very short mixing times must always be used, but experiments indicate that the mixing time should be neither too long nor too short in order to obtain best results. If the materials are mixed slowly for a long period of time, the reaction progresses too far in the mixer and the cement will not properly expand when poured. The product is then too dense and does not have the desired high thermal insulation value. On the other hand, if the mixing time is too short, the cement will slump after rising before setting and control over the density and structure will be lost. While the above-described definite order and schedule of mixing is preferred, it should be noted that in the final analysis, the consistency of the mix at the time of pouring can be used as a guide, that is, the consistency should be at the point of "incipient gelation," as described hereinbefore.

While an ordinary drum type concrete mixer may be employed for the above-described mixing, the agitation secured thereby is not sufficient to yield best results. The best type of mixing device is one which submits the mixture to violent agitation for a short predetermined time, then discharges the mix quickly when the proper stage is reached. Such violent agitation promotes uniform cell structure or size throughout the mass to provide uniform density. A preferred form of such mixer is described in a copending application Serial No. 768,549, filed August 14, 1947, by Joseph J. Dugas, entitled "Mixing Machine" and assigned to the present assignee, now Patent No. 2,513,012. The ordinary drum type concrete mixer provides a non-uniform cell structure and a mass of greater density, therefore of less heat insulating value.

The present invention provides a novel mixture and method of mixing for obtaining a cement product having various outstanding characteristics, such as extreme lightness in weight, uniformly sized cells, high heat insulating value and amazingly high strength so as to make it especially suitable for the fabrication of building walls, floors, ceilings, etc. It is desirable to reinforce the resulting product by one or more metal laths, such as for example, a pair of laths, one adjacent each surface of the cement product, which laths are rigidly held together by suitable spacer elements—or perhaps reinforced by rods or other well-known reinforcing means. When the cement product is so reinforced, it has a strength and resistance to shock which is remarkably higher than any known cementitious product of comparable weight.

Thus the cement composition involving the present invention is highly useful and desirable for the fabrication of the walls, floors and ceilings of homes, buildings and other structures. All the walls of an entire home may be formed at the same time by merely pouring the plastic mixture into a plurality of forms defining the various walls, ceilings, floors, etc., and thereafter permitting the material to expand within the forms and to set over night. The forms are then removed, and all the walls will be completed in place. Homes, therefore, may be fabricated in an exceedingly short time, perhaps a matter of days, which, of course, will considerably expedite building construction.

Thus it will be seen that we have provided a novel, gas expanded, cellular concrete composition whose cells are of uniform structure and which is relatively inexpensive, lightweight, highly heat insulating, low in heat retentivity and possesses certain desirable characteristics had by wood, such as the ability to retain nails and to be sawed—also, we have provided a novel method of mixing ingredients to form such composition. Furthermore, such composition has remarkably high strength for a given weight, particularly when reinforced with metal laths, so as to greatly surpass the strength-to-weight ratio of other cementitious products, thereby making it highly useful not only as a fireproof structural material, but one that is also hurricane-proof, moisture-proof, vermin-proof and dust free. It will be apparent that the present cement product has such a variety of characteristics as to make it suitable for other uses than masonry walls.

It will also be apparent that modifications will be suggested to those skilled in the art after having had the benefit of the teachings of the present invention which are within the scope and purview of the invention, for which reason we do not wish to be limited except insofar as set forth in the following claims.

We claim:

1. The method of making a cementitious product which comprises mixing violently materials in the proportion of 40 gallons of water, one gallon of aqueous bituminous emulsion containing about 55 per cent asphaltic material and 752 pounds of Portland cement; thereafter adding a relatively small and exhaustible amount of aluminum flakes and continuing the violent mixing for about 30 seconds and thereafter adding a small but inexhaustible amount of sodium hydroxide and mixing violently until the point of incipient gelation has been reached, thereupon pouring the mixture into a form and allowing it to set.

2. The method of making a cementitious product which comprises mixing violently materials in about the proportion of 40 gallons of water, about 1 gallon of 55% aqueous asphaltic emulsion and about 752 pounds of Portland cement; thereafter adding a relatively small and exhaustible amount of aluminum particles and continuing the violent mixing, and thereafter adding a small but inexhaustible amount of sodium hydroxide and mixing violently until the point of incipient gelation has been reached, thereupon pouring the mixture into a form and allowing it to set.

3. The method of making a cementitious product which comprises mixing violently materials in about the proportion of 40 gallons of water, about 1 gallon of 55% aqueous asphaltic emulsion and about 752 pounds of Portland cement; thereafter adding a relatively small and exhaustible amount of aluminum particles and continuing the violent mixing for about 30 seconds, and thereafter adding a small but inexhaustible amount of sodium hydroxide and mixing violently until the point of incipient gelation has been reached, thereupon pouring the mixture into a form and allowing it to set.

4. The method of making a cementitious product which comprises mixing violently materials in about the proportion of 40 gallons of water, about 1 gallon of 55% aqueous asphaltic emulsion and about 752 pounds of Portland cement; thereafter adding about .7 pound of aluminum particles and continuing the violent mixing and thereafter adding a small but inexhaustible amount of sodium hydroxide and mixing violently until the point of incipient gelation has been reached, thereupon pouring the mixture into a form and allowing it to set.

5. The method of making a cementitious product which comprises mixing violently materials in about the proportion of 40 gallons of water, about 1 gallon of 55% aqueous asphaltic emulsion and about 752 pounds of Portland cement; thereafter adding about .7 pound of aluminum particles and continuing the violent mixing for about 30 seconds and thereafter adding a small but inexhaustible amount of sodium hydroxide and mixing violently until the point of incipient gelation has been reached, thereupon pouring the mixture into a form and allowing it to set.

6. The method of making a cementitious product which comprises mixing violently materials in about the proportion of 40 gallons of water, about 1 gallon of 55% aqueous asphaltic emulsion and about 752 pounds of Portland cement; thereafter adding about .7 pound of aluminum particles and continuing the violent mixing for about 30 seconds and thereafter adding about 1.4 pounds of sodium hydroxide and mixing violently until the point of incipient gelation has been reached, thereupon pouring the mixture into a form and allowing it to set.

GEORGE H. JOHNSON.
ROLAND C. HIGGINS.

REFERENCES CITED

The following references are of record in the file of this patent:

UNITED STATES PATENTS

| Number | Name | Date |
|---|---|---|
| 1,770,767 | Collings | July 15, 1930 |
| 1,954,117 | Caldwell | Apr. 10, 1934 |
| 1,965,538 | Stewart | July 3, 1934 |
| 2,354,156 | Succetti | July 18, 1944 |